United States Patent
Danaczko

(10) Patent No.: US 12,480,270 B2
(45) Date of Patent: Nov. 25, 2025

(54) SUBMERSIBLE OFFSHORE PLATFORM AND METHOD OF INSTALLING THE SAME

(71) Applicant: Mark A. Danaczko, Houston, TX (US)

(72) Inventor: Mark A. Danaczko, Houston, TX (US)

(*) Notice: Subject to any disclaimer, the term of this patent is extended or adjusted under 35 U.S.C. 154(b) by 0 days.

(21) Appl. No.: 19/205,119

(22) Filed: May 12, 2025

(65) Prior Publication Data

US 2025/0270780 A1    Aug. 28, 2025

Related U.S. Application Data

(62) Division of application No. 18/626,308, filed on Apr. 3, 2024.

(60) Provisional application No. 63/527,985, filed on Jul. 20, 2023, provisional application No. 63/456,779, filed on Apr. 3, 2023.

(51) Int. Cl.
*E02B 17/00* (2006.01)
*E02B 17/02* (2006.01)

(52) U.S. Cl.
CPC ........ *E02B 17/0004* (2013.01); *E02B 17/021* (2013.01); *E02B 2017/0091* (2013.01)

(58) Field of Classification Search
CPC combination set(s) only.
See application file for complete search history.

(56) References Cited

U.S. PATENT DOCUMENTS

| | | |
|---|---|---|
| 5,002,252 A | 3/1991 | Setala et al. |
| 5,072,555 A | 12/1991 | Geiger |
| 7,276,808 B2 | 10/2007 | Weitkamp et al. |
| 7,508,088 B2 | 3/2009 | Kothnur et al. |
| 7,739,843 B2 | 6/2010 | Cortina-Cordero |
| 7,993,107 B2 | 8/2011 | Gevers et al. |
| 8,245,458 B2 | 8/2012 | Johnson et al. |
| 8,258,646 B2 | 9/2012 | Oosterling |
| 8,307,593 B2 | 11/2012 | Bagepalli |
| 8,322,093 B2 | 12/2012 | Zavitz et al. |
| 8,471,396 B2 | 6/2013 | Roddier et al. |
| 8,955,274 B2 | 2/2015 | Brandao et al. |
| 9,617,752 B2 | 4/2017 | Wagner et al. |

(Continued)

FOREIGN PATENT DOCUMENTS

| | | | |
|---|---|---|---|
| DE | 10201040 A1 * | 7/2003 | ............ F03D 13/10 |
| WO | 2019/219448 A1 | 11/2019 | |

*Primary Examiner* — Kyle Armstrong
(74) *Attorney, Agent, or Firm* — Bridgeway IP Law Group, PLLC; Hyun Woo Shin; Sang Ho Lee

(57) ABSTRACT

Provided is a submersible offshore platform configured to be installed at a sea floor installation site and a method of installing the offshore platform. The offshore platform may include: a primary node and a primary column disposed thereon; a plurality of support nodes; a plurality of pontoon sections, each of the plurality of pontoon sections configured to connect the plurality of support nodes to the primary node or to each other; a plurality of buoyant modules, wherein each of the plurality of buoyant modules is detachably connected to a respective support node; and a primary column support system, wherein the primary column support system includes: a plurality of vertical supports fixed around a perimeter of the primary column, each of the plurality of vertical supports having one end connected to the primary column node; and a support structure connecting a top portion of each of the plurality of vertical supports to the primary column.

16 Claims, 11 Drawing Sheets

(56) References Cited

U.S. PATENT DOCUMENTS

| | | |
|---|---|---|
| 10,001,111 B2 | 6/2018 | Patberg et al. |
| 10,041,269 B2 | 8/2018 | Gremling |
| 10,392,233 B2 | 8/2019 | Mayer et al. |
| 10,400,416 B2 | 9/2019 | Polimón Olabarrieta et al. |
| 10,451,043 B2 | 10/2019 | V et al. |
| 10,465,660 B2 | 11/2019 | Agassi |
| 10,640,995 B2 | 5/2020 | Phuly et al. |
| 10,823,150 B2 | 11/2020 | Wang et al. |
| 11,136,780 B2 | 10/2021 | Kersten et al. |
| 2010/0132269 A1 | 6/2010 | Bagepalli et al. |
| 2013/0333371 A1 | 12/2013 | Vigars et al. |
| 2015/0132066 A1 | 5/2015 | Phadke et al. |
| 2016/0258421 A1 | 9/2016 | Agassi |
| 2017/0058549 A1 | 3/2017 | Stiesdal |
| 2018/0030962 A1 | 2/2018 | Bodanese et al. |
| 2018/0230662 A1 | 8/2018 | Khodr |
| 2019/0048548 A1 | 2/2019 | Kuo et al. |
| 2020/0032775 A1 | 1/2020 | Agassi |
| 2020/0277936 A1 | 9/2020 | Riemers |
| 2020/0298944 A1 | 9/2020 | Bowie |
| 2022/0002961 A1* | 1/2022 | Cotrell .................... B63B 1/107 |
| 2022/0074160 A1 | 3/2022 | Zhu et al. |
| 2022/0162825 A1* | 5/2022 | Cobián ................. E02B 17/025 |
| 2022/0228394 A1* | 7/2022 | Danaczko ............... E04H 12/16 |
| 2022/0260057 A1 | 8/2022 | Falkenberg et al. |
| 2022/0411025 A1 | 12/2022 | Chang et al. |
| 2023/0160367 A1 | 5/2023 | Couñago Lorenzo et al. |

\* cited by examiner

SUBMERSIBLE OFFSHORE PLATFORM AND METHOD OF INSTALLING THE SAME

CROSS-REFERENCE TO RELATED APPLICATIONS

This application is a divisional application of U.S. application Ser. No. 18/626,308 filed on Apr. 3, 2024, and claims priority under 35 USC 119(e) to U.S. provisional application Nos. 63/456,779 filed on Apr. 3, 2023, and 63/527,985 filed on Jul. 20, 2023, the contents of which are incorporated by reference in their entirety.

STATEMENT REGARDING PRIOR DISCLOSURES BY THE INVENTOR OR A JOINT INVENTOR

The U.S. patent application Ser. No. 17/575,114 filed on Jun. 13, 2022 (published as US 2022/0228394 A1 on Jul. 21, 2022, and issued on May 9, 2023, as U.S. Pat. No. 11,643,836 B2), which is hereby incorporated herein by reference in its entirety, is not a prior art to the present application as being a prior disclosure made by the inventor under the exception provisions 35 USC § 102(b)(2)(A).

TECHNICAL FIELD

The present disclosure relates to submersible offshore platforms supporting a wind power generation system and configured to be installed at a sea floor installation site and a method of installing the submersible offshore platform at the sea floor installation site. The present disclosure also relates to and is applicable to structures supporting a variety of other equipment and systems, including power substation, oil and gas processing and production, and renewable energy and resource utilization, deployed in a marine or aquatic environment.

BACKGROUND

A typical offshore power generation system, e.g., wind turbine, installation project often starts with the installation of heavy concrete and/or metal foundations that may be installed on the sea floor in pre-planned locations. There are many different types of foundations, including specialized foundations that are configured for certain environmental conditions at a given site. These foundations can include heavy prefabricated concrete bases, monopiles, tripods or similar fixed platforms, and are secured to the sea floor are also used. After the installation of the foundation, a tower is typically constructed, the components of the tower being shipped onsite by one vessel and the tower being lifted into place and attached to the foundation by a crane ship or another specialized vessel having a crane. Next the turbine, which typically includes a drive shaft, transmission, and generator all housed in a nacelle housing, can be lifted into position, and attached to the top of the tower. Following this, the turbine blades may be attached to the hub portion of the drive shaft that extends outwardly from the nacelle housing. Often, each of these components may arrive on different vessels and need to be attached by a specialized crane ship or another specialized vessels.

Thus, the manufacturing and installation process for individual offshore platforms supporting wind power generation systems typically involves a lengthy and costly process in which individual components and/or parts are fabricated onshore and then transported to the offshore site by various cargo ships, barges, and other vessels. Also, crane-carrying ships are deployed to install the foundation and to lift the wind turbine components and parts into the installation position such that the components and parts can be installed. This piecemeal installation process can be cumbersome and take a great deal of time as many different specialized vessels and installation personnel are needed to perform each step of the process. As a result, the installation process can also incur significant financial expenses.

As such, there exists a need for a more economic offshore platform which is more efficient to fabricate, transport, deploy and install at the desired installation site, and which includes reusable components.

SUMMARY OF THE DISCLOSURE

In one aspect of the present disclosure, an offshore platform configured to be submerged and installed at a sea floor installation site may include: a primary node and a primary column disposed thereon; a plurality of support nodes; a plurality of pontoon sections, each of the plurality of pontoon sections configured to connect the plurality of support nodes to the primary node or to each other; and a plurality of buoyant modules, wherein each of the plurality of buoyant modules is detachably connected to a respective support node, and wherein the plurality of buoyant modules are removable from the plurality of support nodes after the offshore platform is submerged and installed at the sea floor installation site.

The primary column may be configured to support a power generating system including a wind turbine.

The plurality of buoyant modules may be reusable after the offshore platform is submerged and installed at the sea floor installation site.

The plurality of support nodes and the plurality of buoyant modules may be detachably connected by a coupling means, and the offshore platform may be submerged in water by controlling a length of the coupling means connecting the support nodes and the buoyant modules.

The coupling means may be one of wire, chain, or cable, or a combination thereof, one end of the coupling means may be connected to the support node and another end of the coupling means is connected to the buoyant module, and the coupling means may be detachable at the one end connected to the support node.

The coupling means may be stored within the buoyant modules prior to the submergence of the offshore platform.

Each of the plurality of support nodes may have a hollow interior configured to at least partially accommodate the buoyant module therein.

Each of the plurality of buoyant modules may be a support column disposed above the plurality of support nodes, and the offshore platform may be submerged in water by ballasting the support columns and at least one of the primary node, the primary column, the plurality of support nodes, and the plurality of pontoon sections.

In another embodiment of the present disclosure, the offshore platform of may further include a primary column support system, wherein the primary column support system includes: a plurality of vertical supports fixed around a perimeter of the primary column, each of the plurality of vertical supports having one end connected to the primary column node; and a support structure connecting a top portion of each of the plurality of vertical supports to the primary column.

The primary column support system may further include one or more intermediate guide structures connected to the primary column and supporting a middle portion of the plurality of vertical supports.

Each of the one or more intermediate guide structures may include a plurality of ring guides, each ring guide surrounding and accommodating the middle portion of a corresponding vertical support, and each ring guide may laterally restrain the corresponding vertical support but is not fixedly connected thereto.

The primary column may be hollow and have a wall having a thickness which varies along a height of the primary column, and the thickness of the primary column may have a step on an inner surface of the wall at a height corresponding to a connection point of the support structure and the primary column.

In yet another aspect of the present disclosure, a method of installing an offshore platform at a sea floor installation site may include: assembling the offshore platform, the offshore platform including: a primary node and a primary column disposed thereon; a plurality of support nodes; a plurality of pontoon sections, each of the plurality of pontoon sections configured to connect the plurality of support nodes to the primary node or to each other; and a plurality of buoyant modules, wherein each of the plurality of buoyant modules is detachably connected to a respective support node; installing the power generating system on the primary column of the offshore platform; transporting the offshore platform to a location of the sea floor installation site; submerging the offshore platform to the sea floor installation site; embedding the offshore platform into the sea floor installation site; and removing the plurality of buoyant modules from the plurality of support nodes.

The method of installing the offshore platform may further include installing a subsea power cable for transmitting electrical power generated by the power generating system.

In yet another aspect of the present disclosure, an offshore platform configured to be submerged and installed at a sea floor installation site may include: a primary node and a primary column disposed thereon; a plurality of support nodes; a plurality of pontoon sections, each of the plurality of pontoon sections configured to connect the plurality of support nodes to the primary node or to each other; and a primary column support system, wherein the primary column support system includes: a plurality of vertical supports fixed around a perimeter of the primary column, each of the plurality of vertical supports having one end connected to the primary column node; a support structure connecting a top portion of each of the plurality of vertical supports to the primary column; and one or more intermediate guide structures connected to the primary column and supporting a middle portion of the plurality of vertical supports, wherein each of the one or more intermediate guide structures comprises a plurality of ring guides, each ring guide surrounding and accommodating the middle portion of a corresponding vertical support, and wherein the each ring guide laterally restrains the corresponding vertical support but is not fixedly connected thereto.

BRIEF DESCRIPTION OF THE DRAWINGS

The drawings depict embodiments of the present disclosure are for purposes of illustration only. One skilled in the art would readily recognize from the following description that alternative embodiments exist without departing from the general principles of the present disclosure.

The features and advantages of the present disclosure will become more apparent to those of ordinary skill in the art by describing exemplary embodiments thereof in detail with reference to the accompanying drawings, in which.

DETAILED DESCRIPTION

Figure 1:
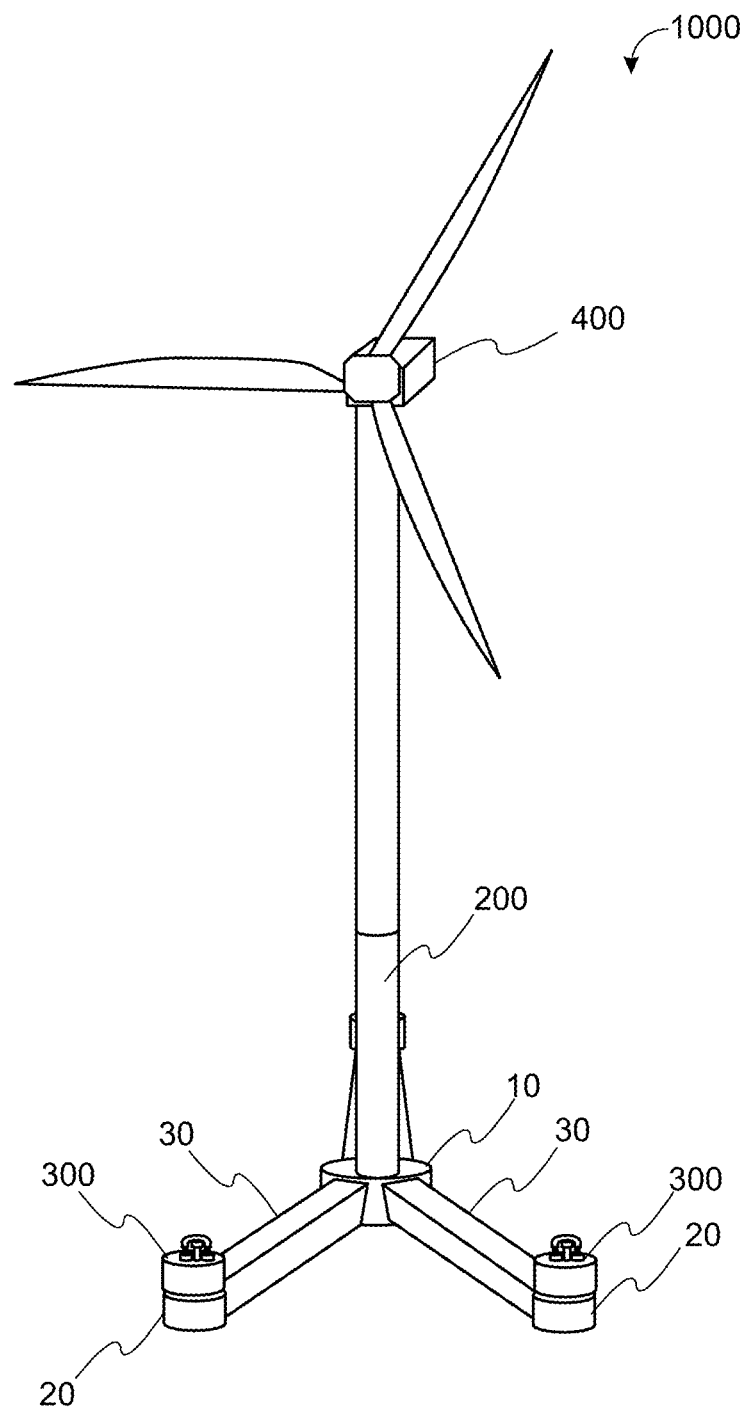
FIG. 1 illustrates an offshore platform according to an embodiment of the present disclosure, including a power generating system installed thereon.

Hereinafter, exemplary embodiments of the present disclosure will be described with reference to the accompanying drawings. In the following description, the same elements may be designated by the same reference numerals although they are shown in different drawings.

Exemplary embodiments have been disclosed herein and in the drawings. Although specific terms have been used herein, the terms are only used for the purpose of describing the present disclosure and are not intended to limit meanings or limit the scope of the present disclosure described in the claims below. Therefore, those of ordinary skill in the art should understand that various modifications and other equivalent embodiments are possible. Accordingly, the actual technical scope of the present disclosure should be defined by the technical idea of the attached claims.

Throughout this specification, when a part is referred to as being "connected" to another part, this includes "direct connection" and "indirect connection" via an intervening part. Also, when a certain part "includes" a certain component, other components are not excluded unless explicitly described otherwise, and other components may in fact be included. Moreover, in describing elements of the present disclosure, terms such as first, second, A, B, (a), (b) and others may be used. Such terms are used only for purposes of distinguishing an element from other elements, but do not limit the substance of the element, sequence, or order.

The use of the terms "a" and "an" and "the" and similar referents in the context of describing the disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

Figure 2:
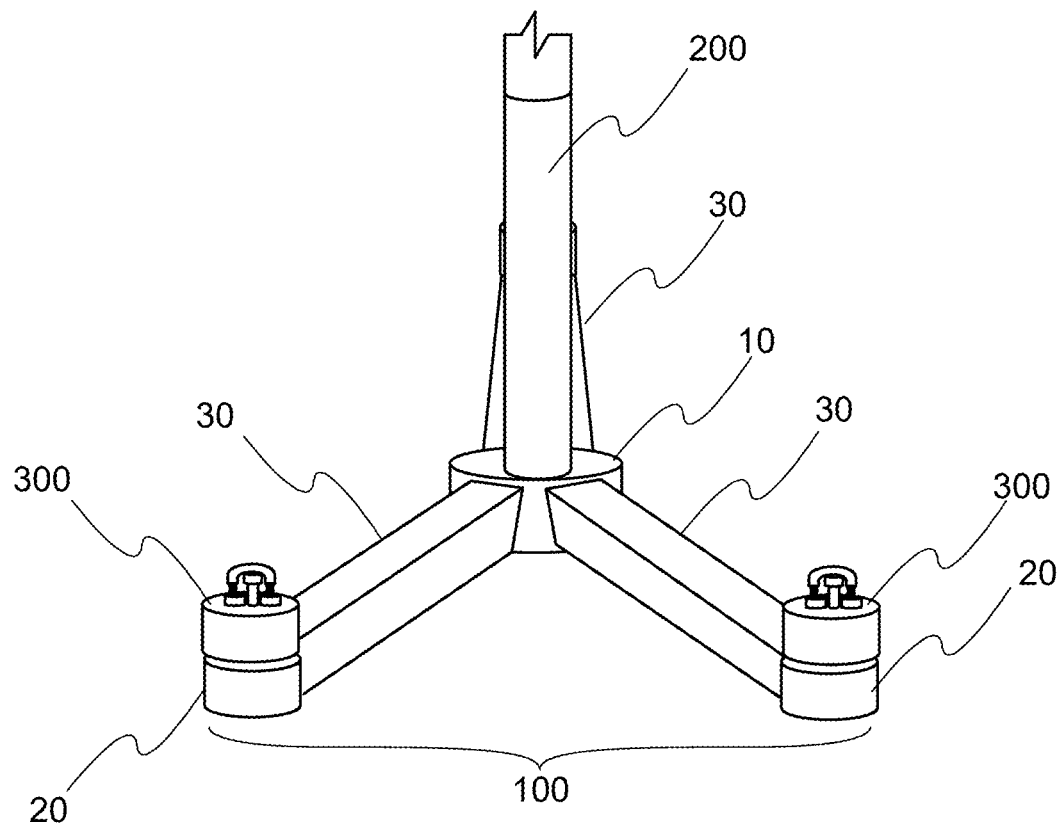
FIG. 2 illustrates a platform base according to an embodiment of the present disclosure.

Referring to FIGS. 1-2, an offshore platform 1000 according to an embodiment of the present disclosure includes a platform base 100, a primary column 200, and a plurality of buoyant modules 300. The offshore platform 1000 assembled with a power generating system 400 is self-installing, and can be embedded in the sea floor at the offshore installation site. While the term "sea floor" is used throughout the present disclosure for convenience, the term includes installation sites in large lakes and bodies of water in which installation of wind farms may be desirable.

The platform base 100 includes a primary node 10, a plurality of support nodes 20, and a plurality of pontoon sections 30 which connect the primary node 10 and the plurality of support nodes 20. The primary column 200 is positioned above the primary node 10, and is configured to support a power generating system 400 including a wind turbine. The primary column 200 may have a uniform shape with a constant diameter or dimensions, or have a tapered shape in which the diameter or dimensions decreases from the base of the primary column to the top, or have "stepped" sections of differing diameters or dimensions. The primary column 200 may be designed to minimize the wave and current loads acting on the primary column in the "wave zone" near the water surface.

The platform base 100 and/or the primary column 200 may also include a ballast system (not shown) for adding or removing water into or out of the platform base 100 and/or the primary column 200 when submerging or removing the offshore platform 1000 into or out of the offshore installation site.

Figure 3C:
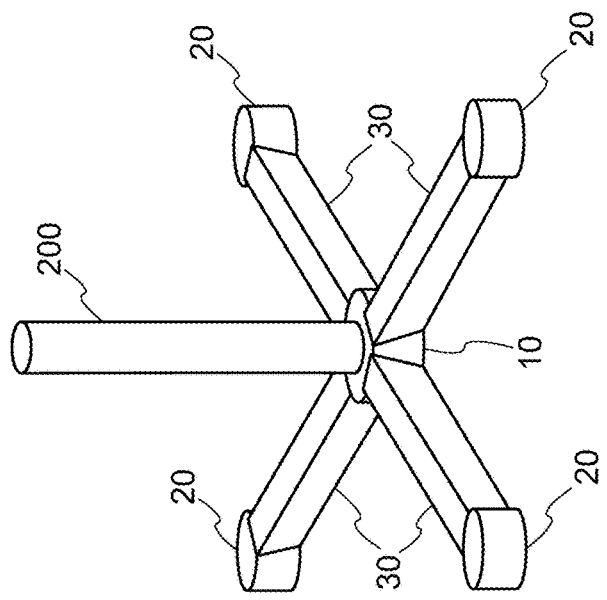
FIGS. 3A-3C illustrate different configurations of the platform base according to an embodiment of the present disclosure.
Figure 3B:
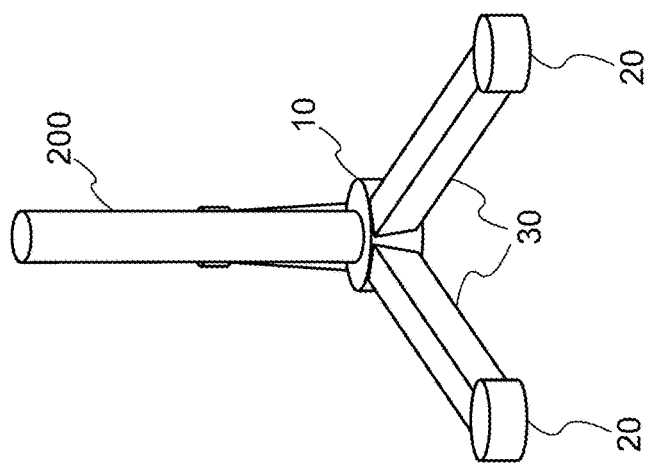
Figure 3A:
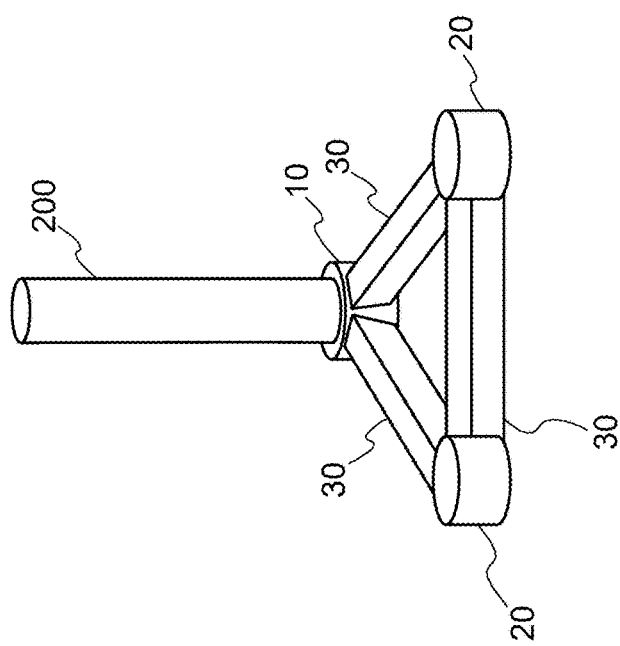

The platform base 100 formed by the primary node 10, the plurality of support nodes 20, and the plurality of pontoon sections 30 may have various configurations, such as a triangular-shape, "Y"-shape, or cross-shape, as shown in FIGS. 3A-3C, but is not limited to these configurations. The components of the platform base 100 and the primary column 200 may be fabricated as modular sections and assembled together at an onshore site. For convenience sake only, the "Y"-shape configuration (shown in FIG. 3B) will be used to further illustrate the key features of the present disclosure.

Figure 4:
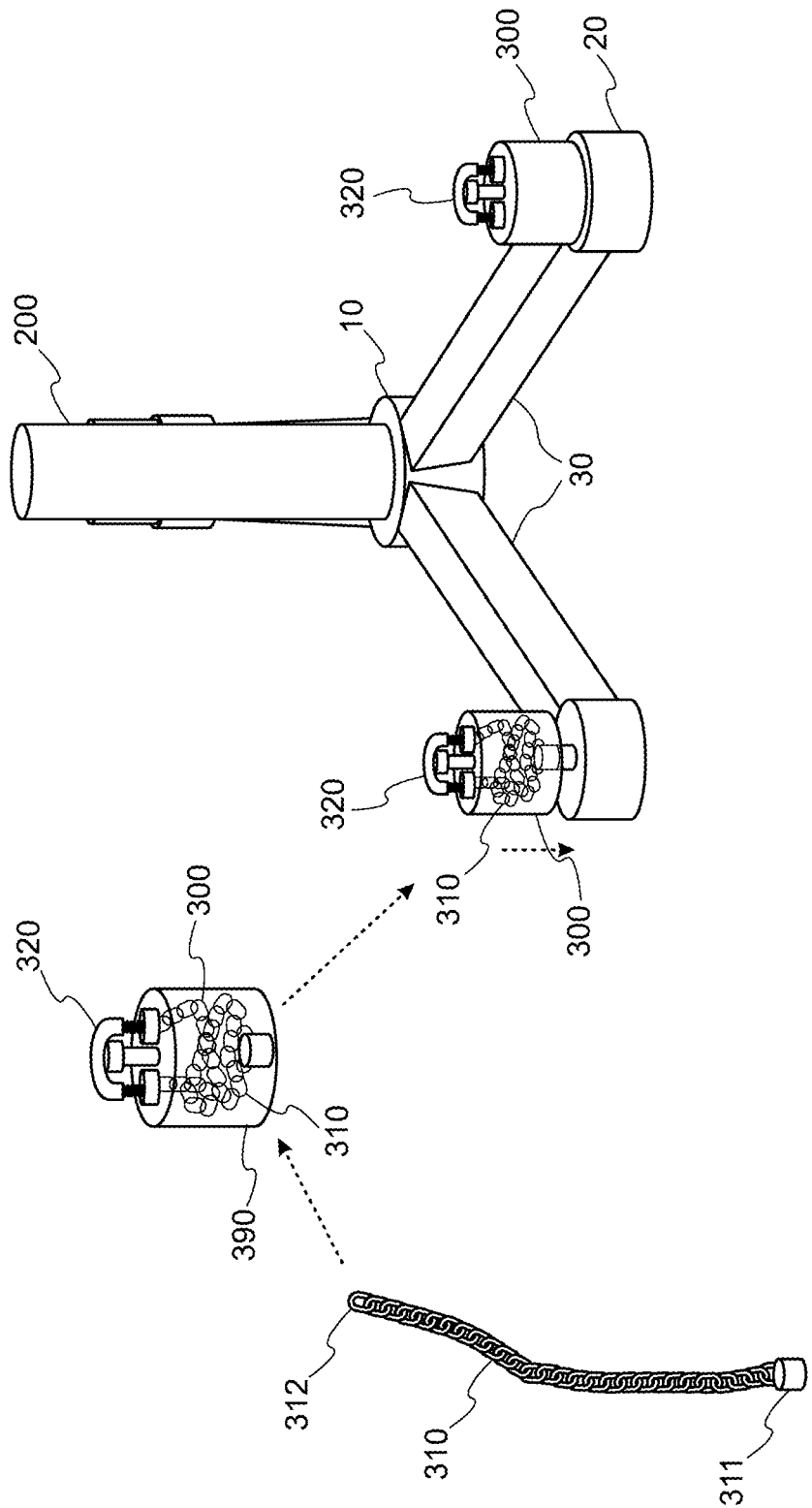
FIGS. 4-5 illustrate the platform base according to embodiments of the present disclosure.

Connected to each of the plurality of support nodes 20 is one or more buoyant modules 300, as shown in FIG. 4. The buoyant modules 300 are configured to provide buoyancy and stability to the offshore platform prior to its submergence at the desired installation site, during transporting, and/or during its submergence to the sea floor. The plurality of buoyant modules 300 would typically be installed on the support nodes 20 at an inshore site and transported with the offshore platform to the offshore installation site. The buoyant modules 300 are positioned near, within, or above the respective nodes 20, and are detachably connected thereto. That is, once the installation of the offshore platform at the sea floor installation site is completed, the plurality of buoyant modules may be detached and retrieved and can be reused for a different offshore platform installation procedure.

Figure 5:
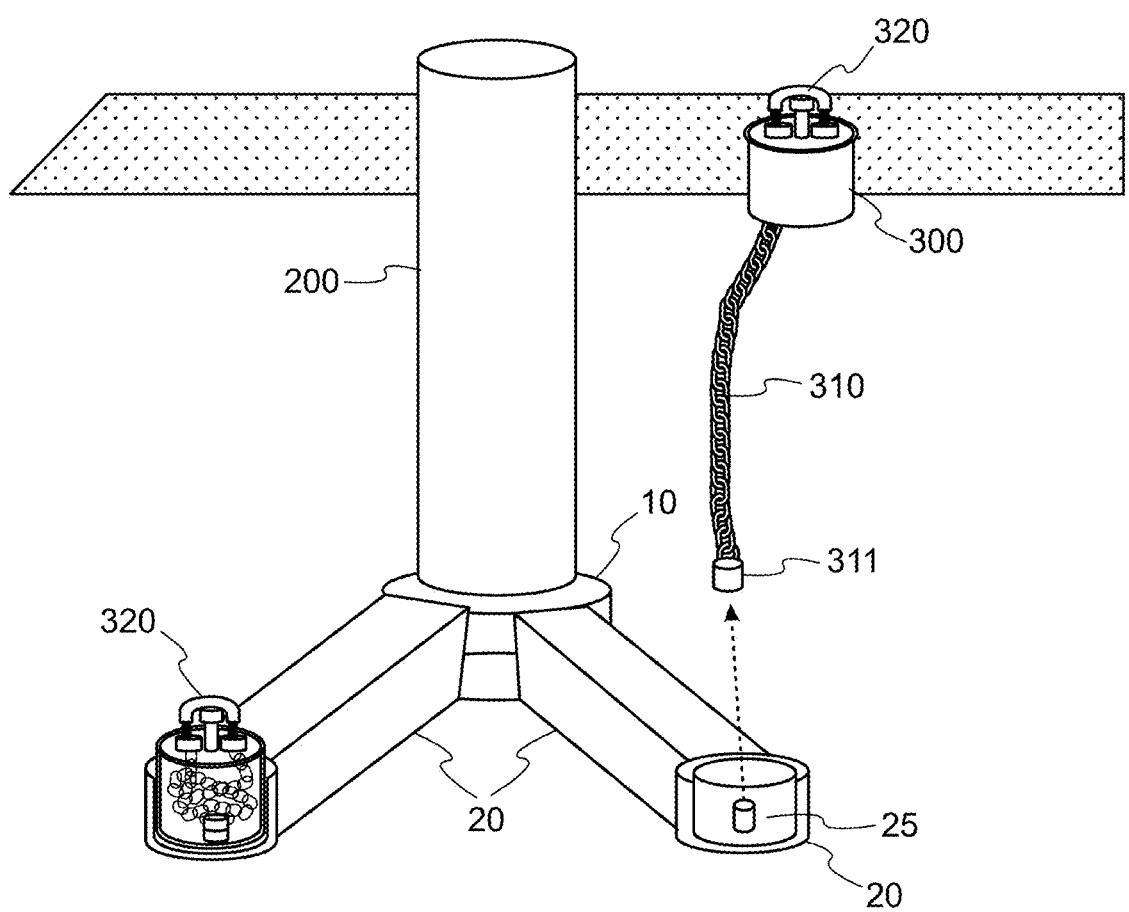

In one embodiment illustrated in FIGS. 4-5, the buoyant modules 300 are detachably connected to the respective support nodes 20 by a coupling means 310. And as shown in FIG. 5, the support node 20 may also include a hollow section 25 configured to accommodate therein at least a portion of the buoyant module 300. The coupling means 310 may be a wire, chain, or cable, or a combination thereof, and the buoyant module 300 may include a hollow section 390 configured to accommodate therein at least a portion of the coupling means 310. One end 311 of the coupling means 310 may be detachably connected to the support node 20, which may be implemented by a mechanical line release mechanism but is not limited thereto. At the other end 312 of the coupling means 310 may be connected to the buoyant module 300 via a mechanical jacking system 320 for releasing and retracting the coupling means 310 during submergence of the offshore platform.

Figure 6:
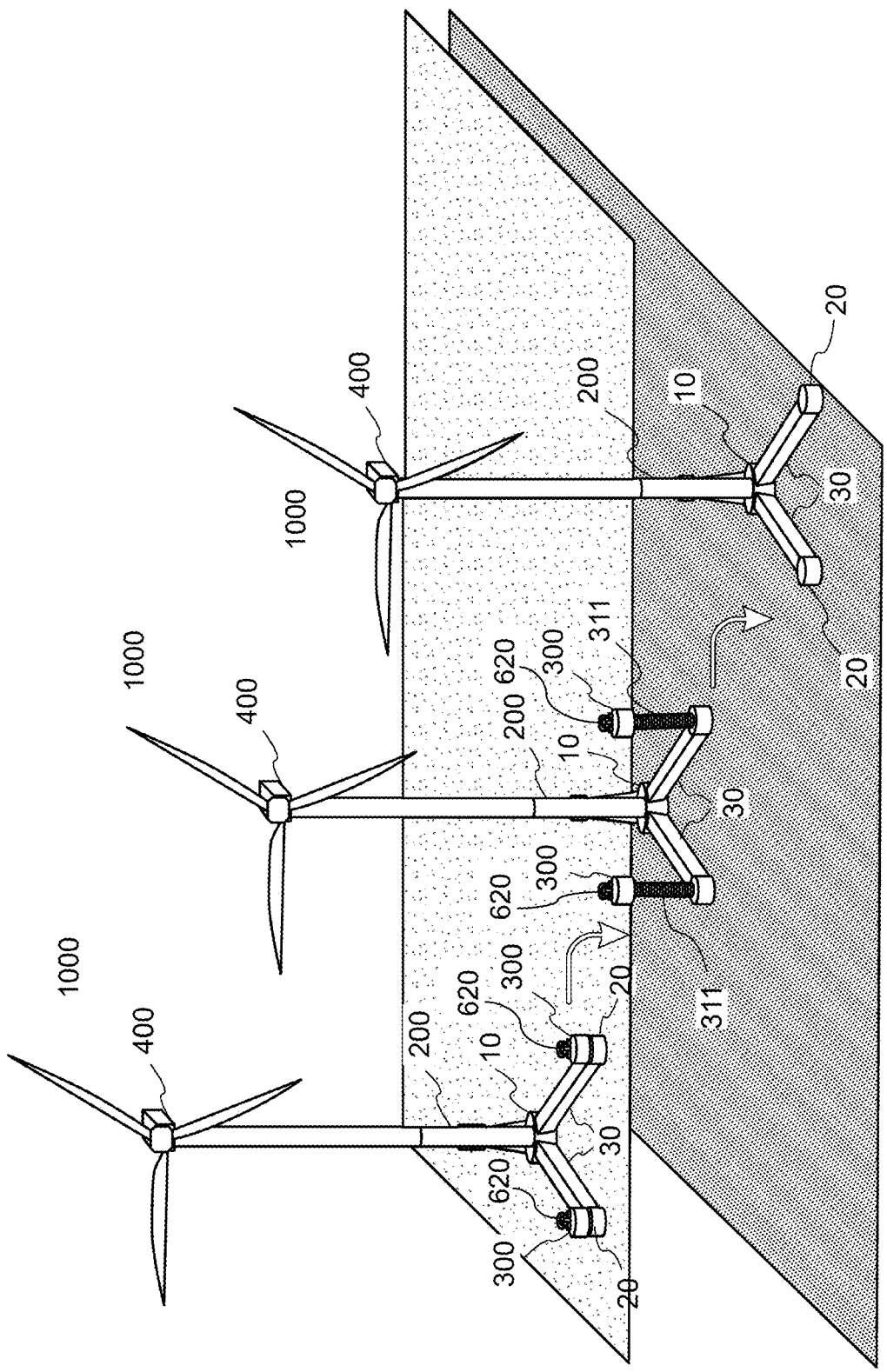
FIGS. 6A-6C illustrate a process of installing an offshore platform according to an embodiment of the present disclosure.

As illustrated in FIGS. 6A-6C, prior to the submergence and installation of the offshore platform, the coupling means 310 is in a retracted state and the buoyant module 300 and the support node 20 are in direct contact or in close proximity with each other (FIG. 6A). However, when initiating the submergence of the offshore platform, the coupling means 310 is released in a controlled manner in synchrony with the submergence of the offshore platform via the mechanical jacking system 320, and the coupling means 310 is extended (FIG. 6B). Due to the extending of the coupling means 310, separation occurs between support module node 20, which is being submerged, and the buoyant module 300, which remains buoyant near the water level. As the coupling means 310 continues to be released by the mechanical jacking system 320, the offshore platform is submerged deeper into the water and the distance between the buoyant module 300 and the support node 20 is increased. During the submergence process, the distance between the buoyant module 300 and the support node 20 corresponds to the length of the released/extended coupling means 310. The coupling means 310 may be released concurrently with at least partial ballasting of the platform base 100 to provide additional stability and control during the submergence process.

When the platform base reaches the sea floor installation site and is fixedly embedded thereto, the coupling means 310 may be detached at the one end connected to the support node 20 and fully separated from the offshore platform and retrieved (FIG. 6C). In one embodiment, the coupling means 310 and the material, structure, and length of the coupling means 310 may be adjusted depending on various factors, including the dimensions/specifications of the offshore platform, dimensions/specifications of the power generating system 400, and environment of the installation site, such as depth of the sea floor, current, etc.

Figure 7:
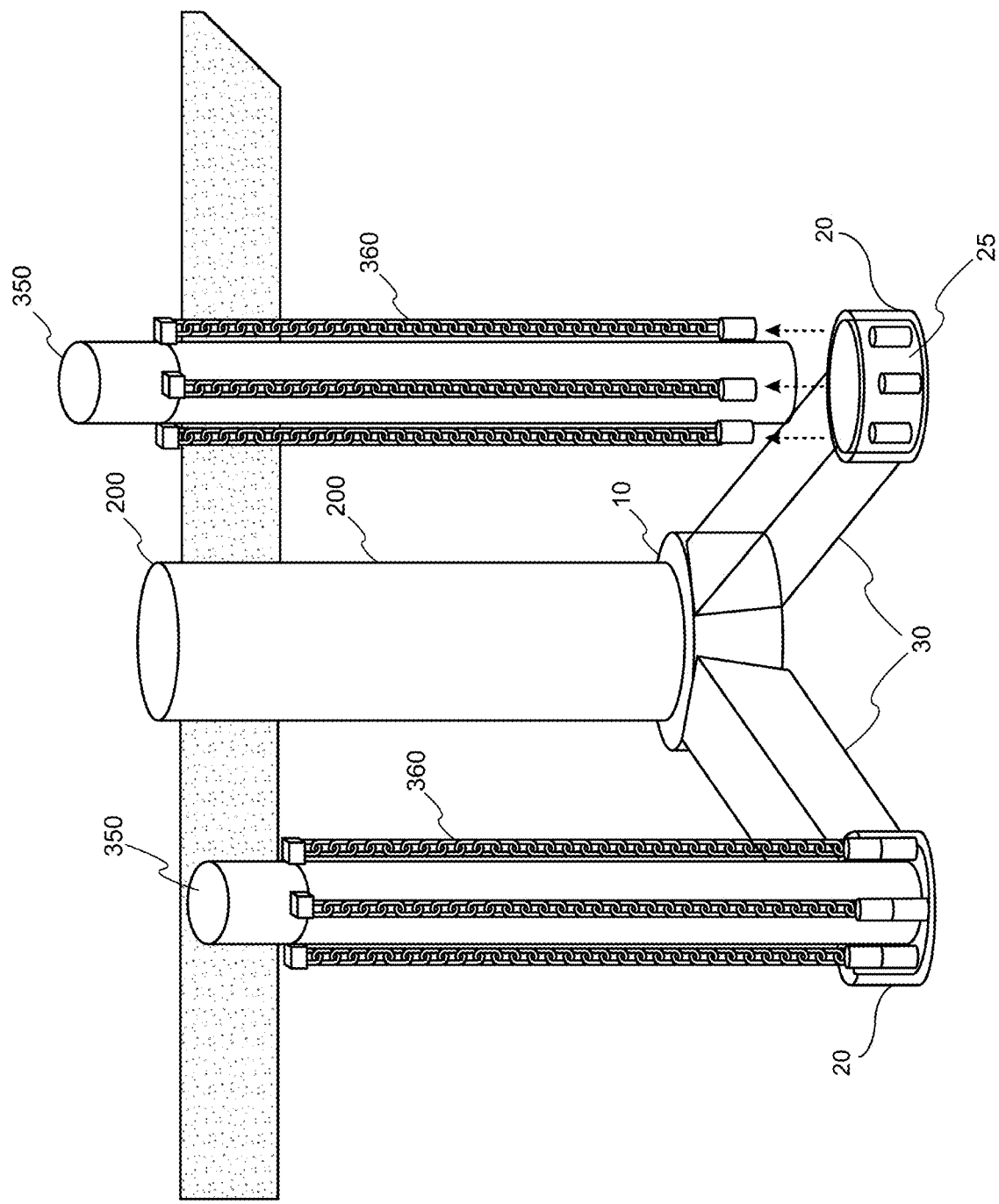
FIG. 7 illustrates a platform base according to another embodiment of the present disclosure.
Figure 8:
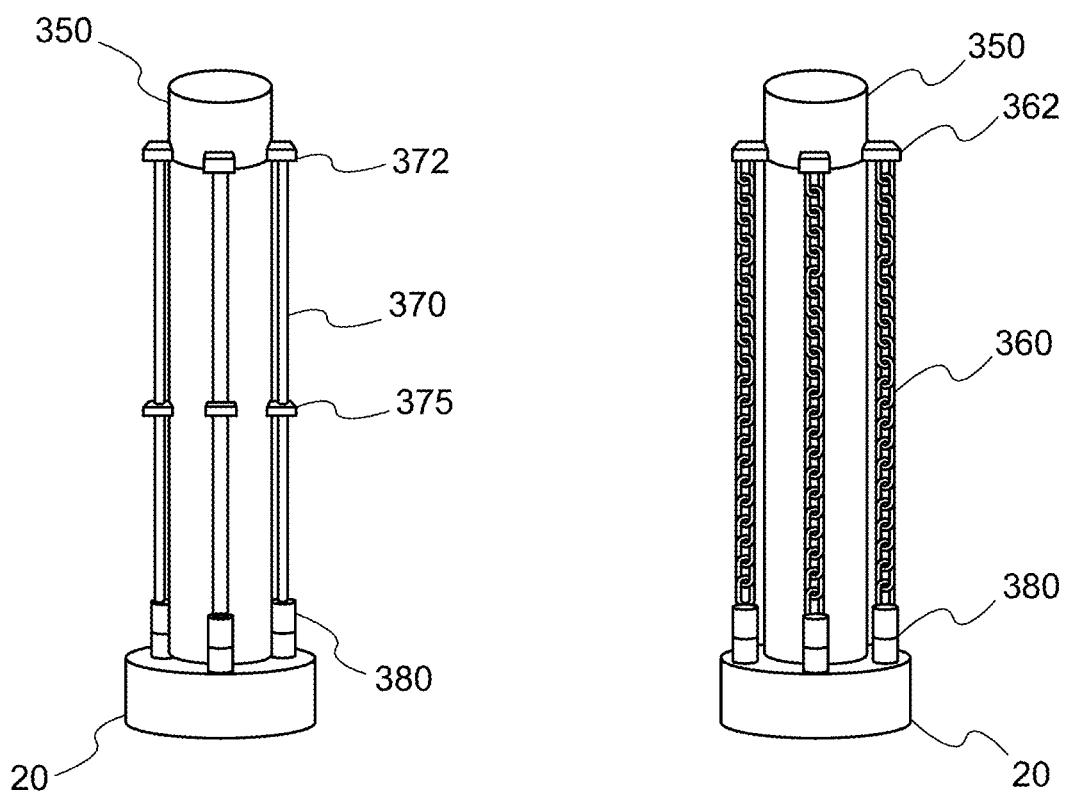
FIG. 8 illustrates supports columns of the platform base according to an embodiment of the present disclosure.

In another embodiment as illustrated in FIG. 7, each of the plurality of buoyant modules may be a support column 350 positioned above the respective support node 20, and the support columns 350 may provide buoyancy and stability to the offshore platform 1000. The support column 350 includes a ballast system (not shown), and the offshore platform 1000 may be submerged by ballasting the support columns and at least one of the primary node 10, the primary column 200, the plurality of supports nodes 20, and the plurality of pontoon sections 30. As illustrated in FIG. 8, the support column 350 may be detachably connected to the respective support node 20 using a vertical chain mechanism 360 or a cable tie-down mechanism 370 in which a lower end of the chain/cable are detachably attached to the support node 20 via a mechanical line release 380 and an upper end of the chain/cable 362/372 are connected to an upper portion of the support column 350. A guide element 375 may be provided near mid-height of the support column 350 to guide the chain/cable.

Similar to the embodiment incorporating the coupling means 310 shown in FIG. 5, the plurality of support columns 350 may be detached and retrieved from the offshore platform once the offshore platform is fully submerged and embedded in the sea floor, and the retrieved support columns may be reused on another offshore platform installation process.

As shown in the embodiments of the present disclosure, the offshore platform may be assembled and transported to the desired location of the sea floor installation site. The buoyant modules 300 may provide additional buoyancy and stability to the buoyancy and stability provided by the platform base for the offshore platform transportation to the offshore installation site. Further, the offshore platform is capable of self-submerging by the interaction between the buoyant modules 300 and the platform base and/or by ballasting. Once the offshore platform is fully submerged and embedded on the installation site, the buoyant modules 300 may be detached, retrieved, and reused. Thus, the buoyant modules 300 function as installation aids, which are removed once the offshore platform is embedded and installed.

Examples of dimensions/specifications of the offshore platform are shown below in Tables 1 and 2.

TABLE 1

DIMENSIONS/SPECIFICATION FOR A 10 MW WIND TURBINE SUBMERGED OFFSHORE WIND PLATFORM-10 MW WIND TURBINE

| WATER DEPTH (meters) | 25 | 50 | 75 |
|---|---|---|---|
| FREEBOARD-PRIMARY COLUMN-SUBMERGED (meters) | 10.0 | 10.0 | 10.0 |
| DIAMETER-PRIMARY COLUMN (meters) | 8.0 | 8.0 | 8.0 |
| DIAMETER-PRIMARY COLUMN NODES (meters) | 8.0 | 8.0 | 8.0 |
| DIAMETER-OUTBOARD COLUMN NODES (meters) | 8.0 | 8.0 | 8.0 |
| PONTOON WIDTH (meters) | 8.0 | 8.0 | 8.0 |
| PONTOON DEPTH (meters) | 4.0 | 4.0 | 4.0 |
| COLUMN NODE SKIRT DEPTH BELOW BASELINE (meters) | 3.0 | 3.0 | 3.0 |
| SPACING-PRIMARY COLUMN-TO-OUTBOARD COLUMN NODE (meters) | 48.5 | 58.0 | 68.5 |
| OVERALL DIMENSIONS WIDTH (meters) | 92 | 108 | 127 |
| OVERAL DIMENSIONS LENGTH (meters) | 81 | 95 | 111 |
| MINIMUM METECENTRIC HEIGHT-GM (meters) | 1.8 | 1.9 | 1.7 |
| TOTAL PLATFORM WEIGHT-(STEEL, OUTFIT & MARINE SYSTEMS) (MT) | 1,579 | 2,125 | 2,694 |
| WIND TURBINE SYSTEM WEIGHT (MT) | 1,280 | 1,280 | 1,280 |
| PLATFORM DISPLACEMENT-EMBEDDED (MT) | 8,119 | 10,697 | 13,392 |

TABLE 2

DIMENSIONS/SPECIFICATION FOR A 15 MW WIND TURBINE SUBMERGED OFFSHORE WIND PLATFORM-15 MW WIND TURBINE

| WATER DEPTH (meters) | 25 | 50 | 75 |
|---|---|---|---|
| FREEBOARD-PRIMARY COLUMN-SUBMERGED (meters) | 10.0 | 10.0 | 10.0 |
| DIAMETER-PRIMARY COLUMN (meters) | 8.0 | 8.0 | 8.0 |
| DIAMETER-PRIMARY COLUMN NODES (meters) | 10.0 | 10.0 | 10.0 |
| DIAMETER-OUTBOARD COLUMN NODES (meters) | 10.0 | 10.0 | 10.0 |
| PONTOON WIDTH (meters) | 10.0 | 10.0 | 10.0 |
| PONTOON DEPTH (meters) | 5.0 | 5.0 | 5.0 |
| COLUMN NODE SKIRT DEPTH BELOW BASELINE (meters) | 3.0 | 3.0 | 3.0 |
| SPACING-PRIMARY COLUMN-TO-OUTBOARD COLUMN NODE (meters) | 68.0 | 77.0 | 87.0 |
| OVERALL DIMENSIONS WIDTH (meters) | 128 | 143 | 161 |
| OVERAL DIMENSIONS LENGTH (meters) | 112 | 125 | 140 |
| MINIMUM METECENTRIC HEIGHT-GM (meters) | 1.3 | 1.4 | 1.3 |
| TOTAL PLATFORM WEIGHT-(STEEL, OUTFIT & MARINE SYSTEMS) (MT) | 2,825 | 3,472 | 4,153 |
| WIND TURBINE SYSTEM WEIGHT (MT) | 2,270 | 2,270 | 2,270 |
| PLATFORM DISPLACEMENT-EMBEDDED (MT) | 13,825 | 15,824 | 21,505 |

Table 1 shows example dimensions for a 10 Mega-Watt (MW) wind turbine to be applied at water depths of 25 meters, 50 meters, and 75 meters, respectively, while Table 2 shows example dimensions for a 15 MW wind turbine to be applied at the same water depths. The examples of Tables 1 and 2 use the "Y"-shape offshore platform configuration. While examples for water depth of 25 meters, 50 meters, and 75 meters, are shown, the offshore platform of the present disclosure may also be deployed between the typical upper water depth limits for fixed platforms and at lower water depth limits for floating wind platforms, which is assumed to be between 50 meters and 100 meters. However, the actual water depth range for the offshore platform of the present application can be greater since the offshore platform can be modified to meet the conditions and requirements for the specific offshore wind project.

In determining the exact dimensions/specifications of the offshore platform, at least the following key design parameters should be considered:

- Provide sufficient buoyancy and stability (e.g., metacentric height, GM, to be greater than 1.0 m) through the offshore platform's integration with the power generating system, i.e., the wind turbine, and during the transportation to the offshore site.
- Be able to achieve a transportation ("wet" tow) draft for the offshore platform that is less than the depth and width restrictions at the inshore integration site and the channel(s) leading to the offshore installation site.
- Provide sufficient freeboard (height above the water surface) for the platform's pontoon sections and the primary and support nodes during the offshore platform's transportation to the offshore site.
- Maintain sufficient freeboard for the primary column and buoyant modules during the submergence of the offshore platform to the seafloor.
- Design the buoyant modules to be securely coupled to and safely released from the support nodes, removed, and reused on multiple offshore platform installations.
- Provide the required offshore platform weight and ballast water, if used, to be able to self-embed into the seafloor.
- Provide a foundation (with or without skirt sections, under keel plates, or high-density fixed ballast materials) with the capacity to resist the loads acting on the platform caused by environmental (e.g., wind, waves, and current) forces.
- Design of a platform that can be constructed within the existing capabilities of local shipyards and fabrication facilities.

The offshore platform as shown and described in the present disclosure and designed and fabricated considering the above key design parameters has distinct advantages over the conventional gravity-based, fixed monopile, tripod or jacket-type platforms, elevated or jack-up-type wind platforms. The offshore platform of the present disclosure has sufficient buoyancy and stability to be transported (e.g., "wet" towed) and installed with a completely integrated wind power generation system, thus eliminating the component-level offshore installation of the wind power generation system that is typically associated with fixed (gravity-based, monopile, tripod, or jacket-type) platforms. Further, the buoyant modules provide stability and control during the "self-submergence" of the offshore platform. Furthermore, the buoyant modules are detachable from the support nodes of the offshore platform once it is fully embedded in the seafloor. The buoyancy modules may be recovered and redeployed for other offshore platform installations.

Figure 9:
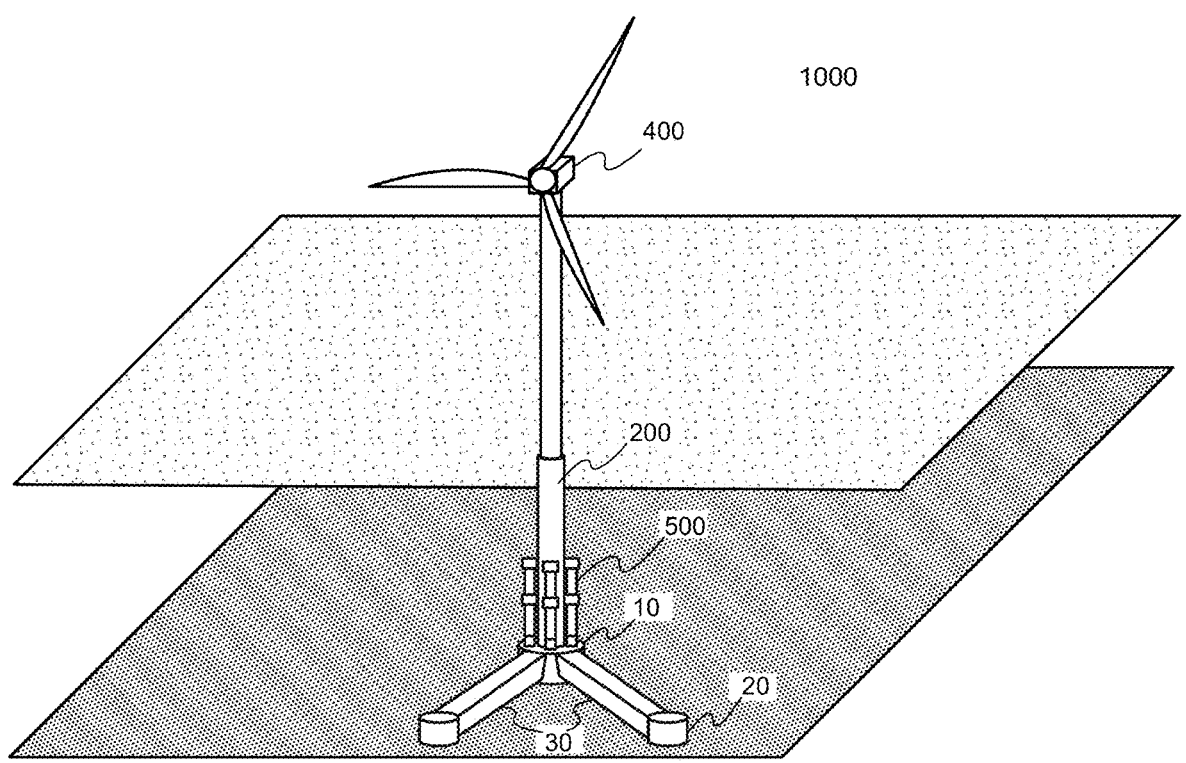
FIG. 9 illustrates an offshore platform including a primary column support system according to an embodiment of the present disclosure.
Figure 10:
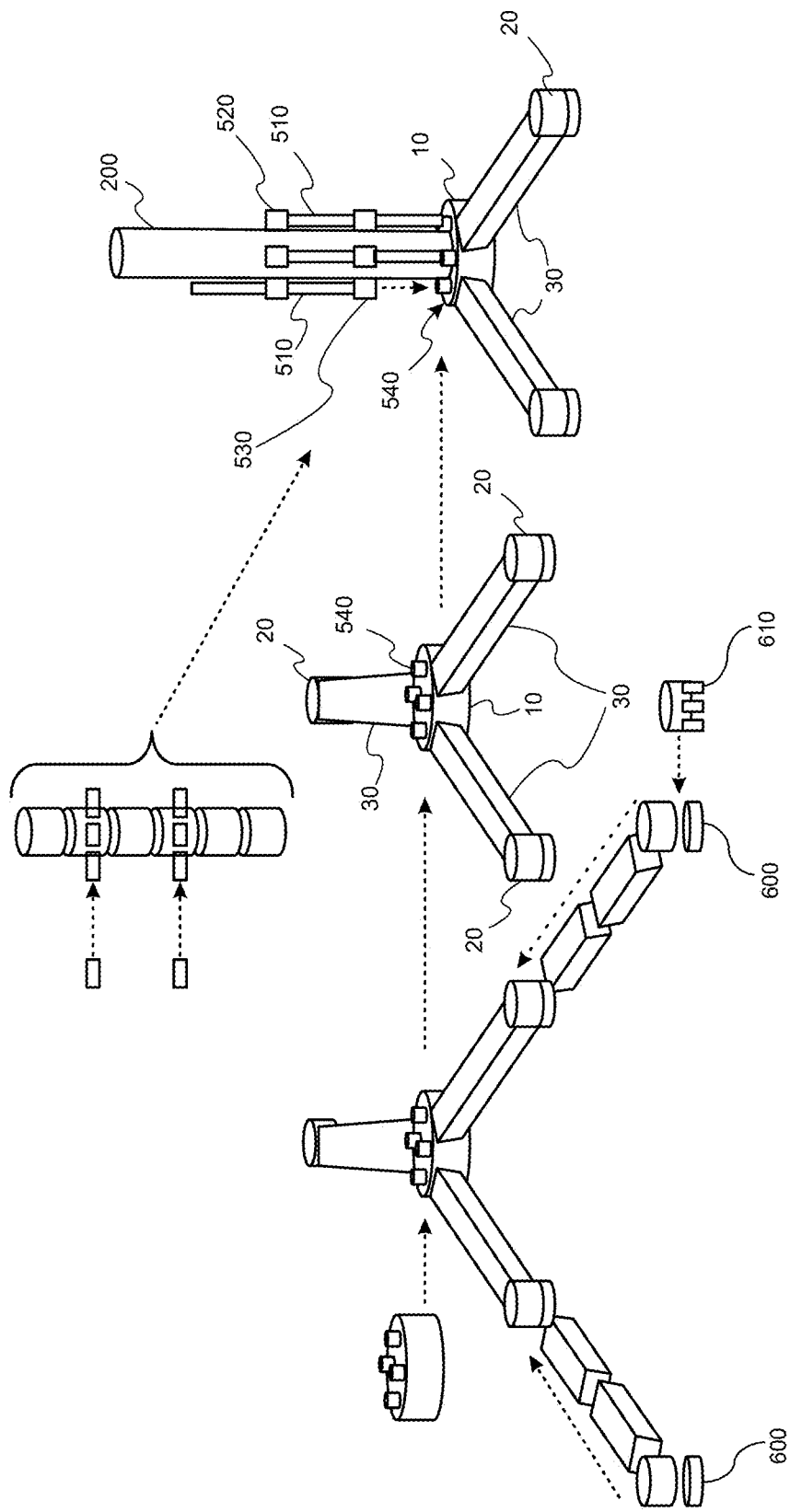
FIGS. 10-11 illustrate a primary column support system according to an embodiment of the present disclosure.
Figure 11:
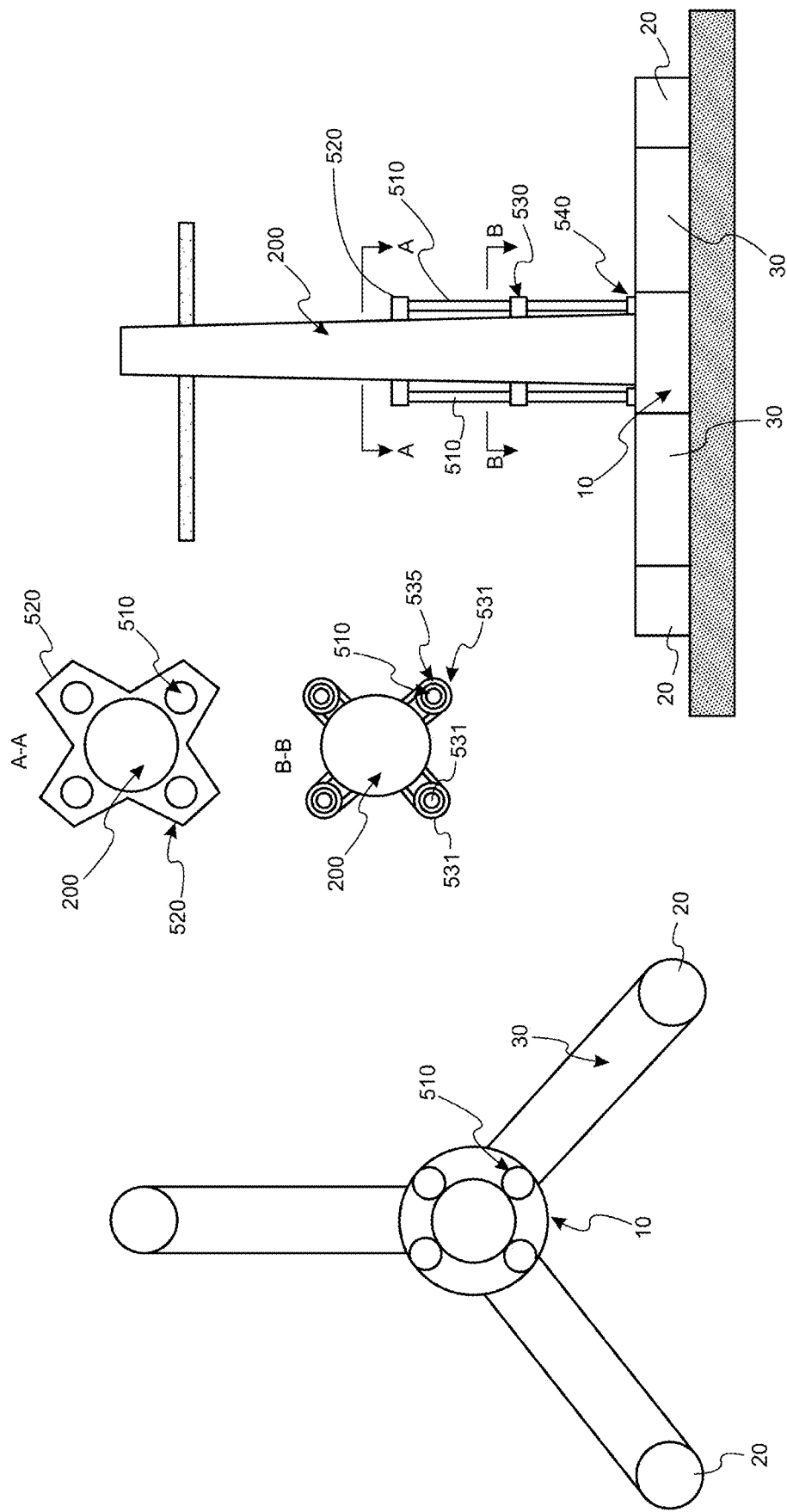

In yet another embodiment of the present disclosure, the offshore platform may further include a primary column support system 500 as shown in FIGS. 9-11. The primary column support system 500 includes a plurality of vertical supports 510 fixed around a perimeter of the primary column 200, each of the plurality of vertical supports 510 having one end connected to the primary node 10, a support structure 520 connecting a top portion (e.g., a top end) of each of the plurality of vertical supports 510 to a side portion the primary column 200.

The vertical supports 510 may have various structures and shapes and may be made of various different materials. For example, the vertical supports 510 may be, but are not limited to, vertically oriented thin-walled tubular (pipe-type) sections, vertical pre-tensioned solid rods, or cables (such as structural "bridge" cables), or vertically oriented threaded pipe sections or thick-walled pipes (such as drill pipes) but are not limited thereto. Further, while the exemplary drawings of the present application show embodiments of the present disclosure having a specific number of vertical supports 510, the number of the vertical supports 510 may be adjusted depending on the size, location, requirements of the offshore platform. In a preferred embodiment, the vertical supports 510 are positioned symmetrically around the perimeter or circumference of the primary column 200, and bottom ends of the vertical supports 510 may be fixed around the perimeter of the primary column 200 via receptacle sleeves 540 which are integrated into the primary node 10, as shown in FIGS. 10-11. The vertical supports 510 counter the bending moments developed in the primary column 200 due to its exposure to the wind, wave, and current forces acting above the support structure 520.

The material and shape of the vertical supports 510 can be selected to limit the amount of lateral displacement of the primary column 200 based on the properties of the material (modulus of elasticity), the number, length, and cross-sectional properties (diameter, wall thickness) of the vertical supports 510.

Further, as shown in FIGS. 10-11, the primary column support system 500 may further include one or more intermediate guide structures 530 connected to the primary column between the support structure 520 and the bottom end of the primary column 20, which stabilizes a middle portion of the plurality of vertical supports 510. The intermediate guide structure 530 provides lateral restraint to the vertical supports 510 as a means to increase the buckling capacity, i.e., maximum allowable compression load, of the vertical supports 510.

The intermediate guide structure 530 may include a plurality of ring guides 531, as shown in FIG. 11. Each ring guide 531 surrounding and accommodating the middle portion of the corresponding vertical support 510. Here, the ring guides 531 laterally restrains the corresponding vertical supports 510, but may not be fixedly connected thereto and may include an annular space or gap 535 between the vertical supports 510 and the intermediate guide structure 530.

To further secure the offshore platform to the sea floor, the platform base 100 may incorporate skirt sections 600 or vertically oriented under keel plates that extend downward from a bottom side of the platform base. After installation, the platform base may be filled with high-density fixed ballast material, such as sand, gravel, or cement, to further secure the offshore platform to the sea floor.

In another aspect of the present disclosure, a method for installing an offshore platform for supporting a power generating system at a sea floor installation site includes:

A. assembling the offshore platform;
B. installing the power generating system on the primary column of the offshore platform;
C. transporting the offshore platform to a location of the sea floor installation site;
D. submerging the offshore platform to the sea floor installation site;
E. embedding the offshore platform to the sea floor installation site; and
F. removing the plurality of buoyant modules from the plurality of support nodes, In the assembling the offshore platform, the offshore platform may include a primary node and a primary column disposed thereon, wherein the primary column is configured to support a power generating system including a wind turbine; a plurality of support nodes; a plurality of pontoon sections, each of the plurality of pontoon sections configured to connect the plurality of support nodes to the primary node or to each other; and a plurality of buoyant modules, wherein each of the plurality of buoyant modules is detachably connected to a respective support node. The assembling may be performed on an onshore or inshore fabrication site.

After the offshore platform is assembled, it may be transported to an inshore integration site via a barge or by "wet" tow using anchor handling vessels or tugs, where the power generating system, e.g., wind turbine, is installed on the primary column.

Then, the completely integrated offshore platform is transported to a location of the sea floor installation site by "wet" towing using multiple anchor handling vessels. Once arrived at the sea floor installation site, the offshore platform is self-submerged using the buoyant modules and/or ballasting, while the multiple anchor handling vessels are used to maintain general horizontal position of the offshore platform while submerging. Further, the plurality of buoyant modules and the plurality of support may be detachably coupled by a coupling means, and during the submerging, a length of the coupling means is controlled to stabilize and facilitate the submerging. The coupling means may be one of wire, chain, or cable, or a combination thereof.

After the submerging is completed and the offshore platform has reached the sea floor, the offshore platform is fixed and embedded in the sea floor. To further secure the offshore platform to the sea floor, a rock-based scour protection system can be laid around (and potentially over) the platform's primary node, support nodes, and pontoon sections to prevent deterioration of the offshore platform's foundation. The scour protection system may be installed using a specialized offshore vessel.

Once the offshore platform is fully secured to the sea floor, the plurality of buoyant modules may be detached and removed from the plurality of support nodes. The removed buoyant modules may be reused for an installation procedure of another offshore platform.

The method of installing the offshore platform may also include installing a subsea power cable for transmitting electrical power generated by the power generating system using a specialized cable laying vessel. The subsea power cable may transmit the electrical power to another offshore platform or an onshore power station.

As described above, the optimal embodiments have been disclosed in the drawings and the specification. Specific terms have been used herein for descriptive purposes, not for purposes of limitation of meanings or to limit the scope of the invention as set forth in the claims. Therefore, it would be understood by those skilled in the art that various modifications and equivalent embodiments are possible from the present disclosure. Accordingly, the true scope of protection of the present disclosure should be determined by the technical concept of the attached claims.

The invention claimed is:

1. An offshore platform configured to be submerged and installed at a sea floor installation site, the offshore platform comprising:
    a primary node and a primary column disposed thereon;
    a plurality of support nodes;
    a plurality of pontoon sections, each of the plurality of pontoon sections configured to connect the plurality of support nodes to the primary node or to each other;
    a plurality of buoyant modules, wherein each of the plurality of buoyant modules is detachably connected to a respective support node; and
    a primary column support system, wherein the primary column support system comprises:
    a plurality of vertical supports fixed around a perimeter of the primary column, each of the plurality of vertical supports having one end connected to the primary column node; and
    a support structure connecting a top portion of each of the plurality of vertical supports to the primary column,
    wherein the plurality of buoyant modules are removable from the plurality of support nodes after the offshore platform is submerged and installed at the sea floor installation site.

2. The offshore platform of claim 1, wherein the primary column is configured to support a power generating system including a wind turbine.

3. The offshore platform of claim 1, wherein the plurality of buoyant modules are reusable after the offshore platform is submerged and installed at the sea floor installation site.

4. The offshore platform of claim 1, wherein the plurality of support nodes and the plurality of buoyant modules are detachably connected by a coupling means, and
    wherein the offshore platform is submerged in water by controlling a length of the coupling means connecting the support nodes and the buoyant modules.

5. The offshore platform of claim 4, wherein the coupling means is one of wire, chain, or cable, or a combination thereof, one end of the coupling means is connected to the support node and another end of the coupling means is connected to the buoyant module, and the coupling means is detachable at the one end connected to the support node.

6. The offshore platform of claim 4, wherein the coupling means is stored within the buoyant modules prior to the submergence of the offshore platform.

7. The offshore platform of claim 1, wherein each of the plurality of support nodes have a hollow interior configured to at least partially accommodate the buoyant module therein.

8. The offshore platform of claim 1, wherein each of the plurality of buoyant modules is a support column disposed above the plurality of support nodes, and the offshore platform is submerged in water by ballasting the support columns and at least one of the primary node, the primary column, the plurality of support nodes, and the plurality of pontoon sections.

9. The offshore platform of claim 1, wherein the primary column support system further comprises one or more intermediate guide structures connected to the primary column and supporting a middle portion of the plurality of vertical supports.

10. The offshore platform of claim 9, wherein each of the one or more intermediate guide structures comprises a plurality of ring guides, each ring guide surrounding and accommodating the middle portion of a corresponding vertical support, and
   wherein each ring guide laterally restrains the corresponding vertical support but is not fixedly connected thereto.

11. The offshore platform of claim 1, wherein the primary column is hollow and has a wall having a thickness which varies along a height of the primary column, and the thickness of the primary column has a step on an inner surface of the wall at a height corresponding to a connection point of the support structure and the primary column.

12. A method of installing an offshore platform at a sea floor installation site, the method comprising:
   assembling the offshore platform, the offshore platform comprising:
      a primary node and a primary column disposed thereon;
      a plurality of support nodes;
      a plurality of pontoon sections, each of the plurality of pontoon sections configured to connect the plurality of support nodes to the primary node or to each other;
      a plurality of buoyant modules, wherein each of the plurality of buoyant modules is detachably connected to a respective support node; and
      a primary column support system, wherein the primary column support system comprises:
         a plurality of vertical supports fixed around a perimeter of the primary column, each of the plurality of vertical supports having one end connected to the primary column node; and
         a support structure connecting a top portion of each of the plurality of vertical supports to the primary column;
   transporting the offshore platform to a location of the sea floor installation site;
   submerging the offshore platform to the sea floor installation site;
   embedding the offshore platform into the sea floor installation site; and
   removing the plurality of buoyant modules from the plurality of support nodes.

13. The method of claim 12, wherein the primary column is configured to support a power generating system including a wind turbine, and
   wherein the method further comprises installing the power generating system on the primary column of the offshore platform.

14. The method of claim 13, further comprising:
   installing a subsea power cable for transmitting electrical power generated by the power generating system.

15. The method of claim 12, wherein the plurality of support nodes and the plurality of buoyant modules are detachably connected by a coupling means, and
   wherein the submerging the offshore platform to the sea floor installation site comprises controlling a length of the coupling means connecting the support nodes and the buoyant modules.

16. The method of claim 15, wherein the coupling means is one of wire, chain, or cable, or a combination thereof, one end of the coupling means is connected to the support node and another end of the coupling means is connected to the buoyant module, and the coupling means is detachable at the one end connected to the support node.

* * * * *